(No Model.)
A. M. PEATE & H. M. KOOSCH.
BICYCLE ATTACHMENT.
No. 597,527. Patented Jan. 18, 1898.
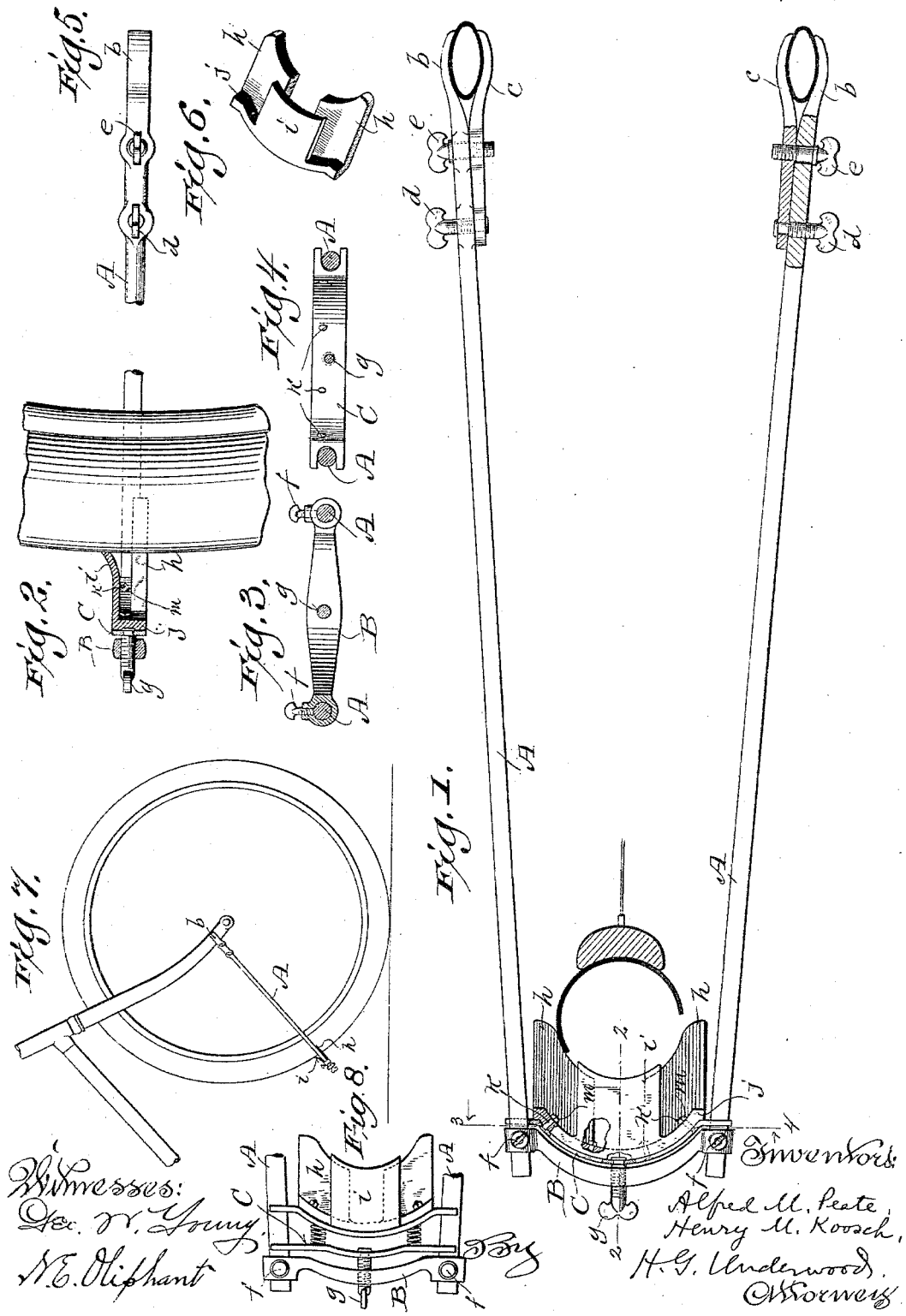
Witnesses:
Geo. W. Young.
N. E. Oliphant.
Inventors:
Alfred M. Peate,
Henry M. Koosch,
H. G. Underwood

UNITED STATES PATENT OFFICE.

ALFRED M. PEATE AND HENRY M. KOOSCH, OF MILWAUKEE, WISCONSIN.

BICYCLE ATTACHMENT.

SPECIFICATION forming part of Letters Patent No. 597,527, dated January 18, 1898.

Application filed March 15, 1897. Serial No. 627,610. (No model.)

*To all whom it may concern:*

Be it known that we, ALFRED M. PEATE and HENRY M. KOOSCH, citizens of the United States, and residents of Milwaukee, in the county of Milwaukee and State of Wisconsin, have invented certain new and useful Improvements in Bicycle Attachments; and we do hereby declare that the following is a full, clear, and exact description thereof.

Our invention has for its object to prevent a bicycle and its rider from being spattered with mud and water picked up by the wheels of the vehicle from the surface over which they travel; and it consists in certain peculiarities of construction and combination of parts constituting the bicycle attachment hereinafter set forth with reference to the accompanying drawings and subsequently claimed.

Figure 1 of the drawings represents a partly-sectional plan view of one of our bicycle attachments in working position; Figs. 2, 3, and 4, partly-sectional views indicated by lines 2 2 and 3 4 in the first figure; Fig. 5, a side elevation of a clamp portion of the stay-frame herein shown as part of the bicycle attachment; Fig. 6, a perspective view of a flexible shoe constituting part of said attachment; Fig. 7, an elevation of a portion of a bicycle provided with the aforesaid attachment, and Fig. 8 a detail plan view illustrating another form of carrier from that shown in preceding figures.

Referring by letter to the drawings, we show a stay-frame comprising a pair of rods A in yoke connection at the rear, each rod having its forward end fashioned to form the stationary jaw $b$ of a clamp, the other or movable jaw $c$ of the clamp being in the form of a suitably-fashioned plate connected by thumb-screws $d$ $e$ to the rod. The screw $d$ is herein shown as having its thread engaged with a correspondingly-tapped opening in the rod and its inner end swiveled in the movable jaw-plate constituting part of the clamp. The other screw $e$ has free rotation in the rod and its thread engages a correspondingly-tapped opening in the movable jaw-plate. Hence from the foregoing description and the illustration in Fig. 1 it will be seen that the two screws of each clamp work in opposite directions with reference to said movable jaw-plate in order to obtain the best possible clamping adjustment of the same.

The clamp-rods are for detachable connection with rear-fork braces or steering-fork sides of a bicycle to come outside the adjacent wheel, the angle of arrangement being substantially that shown in Fig. 7.

While it is practical to make the rear yoke of the stay-frame in one piece with the rods, we have herein shown said yoke as being a separate part B, adjustable longitudinally of said rods and held in adjusted position thereon by means of set-screws $f$, as best illustrated in Fig. 3.

In sliding connection with rods A of the stay-frame, ahead of the yoke, is a carrier C, and a thumb-screw $g$, adjustable in the yoke, has swivel connection with the carrier, as best illustrated in Fig. 2. The carrier may be a single plate, such as shown in the majority of the figures, or it may comprise a pair of plates connected by spiral springs, as shown in Fig. 8.

Made fast to the front of the carrier is a shoe of flexible material, preferably rubber, that has sufficient impingement against the adjacent wheel-tire to strip the latter of mud and water that would otherwise be carried up and spattered upon the bicycle and its rider, the proper adjustment of the shoe and compensation for wear upon the same being effected by the thumb-screw $g$ in connection with said carrier. In that form of carrier shown by Fig. 8 the adjusting-screw $g$ has connection with the rear plate and the shoe is made fast to the forward plate, the latter being capable of rearward yield against the resistance of the springs intermediate of both plates, whereby provision is had for self-adjustment of said shoe to compensate for inequalities in the projection of the wheel-tire from the rim on which it is secured.

As a matter of detail the shoe comprises two lower scrapers $h$, operative against the sides of the wheel-tire, a central upper scraper $i$, that overlaps the ones aforesaid, to operate against the tread of said tire, and a scraper-connecting flange $j$, that has the same contour as the carrier C, to which it is made fast by any suitable means. It is preferable, as herein shown, to provide the flange portion of the shoe with apertures for the engagement of bolts $k$, having their heads countersunk in the carrier, and nuts $m$, run on the bolts against said flange, serve to hold the shoe in working position. By this preferred means for uniting the carrier and shoe we provide for the ready substitution of a new shoe for one that has become unserviceable from wear. The scraper portions of the shoe being flexible, no appreciable resistance is offered to the wheel-tire on which they operate.

Having thus described our invention, what we claim as new, and desire to secure by Letters Patent, is—

1. A bicycle attachment comprising a stay-frame and suitable means for connecting the same with rear-fork braces or steering-fork sides of the vehicle, a carrier supported by the stay-frame, and a tire-impinging flexible shoe consisting of a pair of lower side scrapers, a central upper tread-scraper overlapping the ones aforesaid and a scraper-connecting flange made fast to the carrier.

2. A bicycle attachment comprising a stay-frame and suitable means for connecting the same with rear-fork braces or steering-fork sides of the vehicle, a carrier adjustable longitudinally of the stay-frame, and a tire-impinging flexible shoe consisting of a pair of lower side scrapers, a central upper tread-scraper overlapping those aforesaid, and a scraper-connecting flange made fast to the carrier.

3. A bicycle attachment comprising a stay-frame and suitable means for connecting the same with rear-fork braces or steering-fork sides of the vehicle, a spring-controlled carrier supported by the stay-frame, and a tire-impinging flexible shoe consisting of a pair of lower side scrapers, a central upper tread-scraper overlapping the ones aforesaid and a scraper-connecting flange made fast to the carrier.

In testimony that we claim the foregoing we have hereunto set our hands, at Milwaukee, in the county of Milwaukee and State of Wisconsin, in the presence of two witnesses.

ALFRED M. PEATE.
HENRY M. KOOSCH.

Witnesses:
N. E. OLIPHANT,
B. C. ROLOFF.